United States Patent [19]
Nordman

[11] Patent Number: 5,078,361
[45] Date of Patent: Jan. 7, 1992

[54] POSITIVE OPENING PINCH VALVE
[75] Inventor: Eric S. Nordman, Palo Alto, Calif.
[73] Assignee: Applied Biosystems Inc., Foster City, Calif.
[21] Appl. No.: 621,485
[22] Filed: Dec. 4, 1990
[51] Int. Cl.⁵ .............................................. F16K 7/06
[52] U.S. Cl. .......................................... 251/7; 251/4; 251/129.01
[58] Field of Search ................................ 251/4, 7, 8, 5

[56]     References Cited
       U.S. PATENT DOCUMENTS

| | | | |
|---|---|---|---|
| 3,508,587 | 4/1970 | Mauch | 251/4 X |
| 3,624,800 | 11/1971 | Swick | 251/4 |
| 4,496,133 | 1/1985 | Sule | 251/7 |
| 4,548,382 | 10/1985 | Otting | 251/5 |
| 4,921,206 | 5/1990 | Dunstan et al. | 251/7 |

Primary Examiner—Martin P. Schwadron
Assistant Examiner—Kevin L. Lee
Attorney, Agent, or Firm—Ronald E. Grubman; Joseph H. Smith

[57] ABSTRACT

A solenoid operated pinch valve has a flexible conductor with extensions on each side of the fluid passage for connecting to the valve frame and to a solenoid plunger. In a preferred mode the valve is normally closed by a spring and actuated open. In a preferred embodiment, the flexible fluid conductor is held in the frame at the ends to prevent transferral of stress from connectors and tubings to the pinch area of the valve. A portion of the fluid passage at the pinch area is especially shaped to reduce stress and fatigue on the flexible material. In other embodiments, valves may be normally open or actuated in both directions.

5 Claims, 5 Drawing Sheets

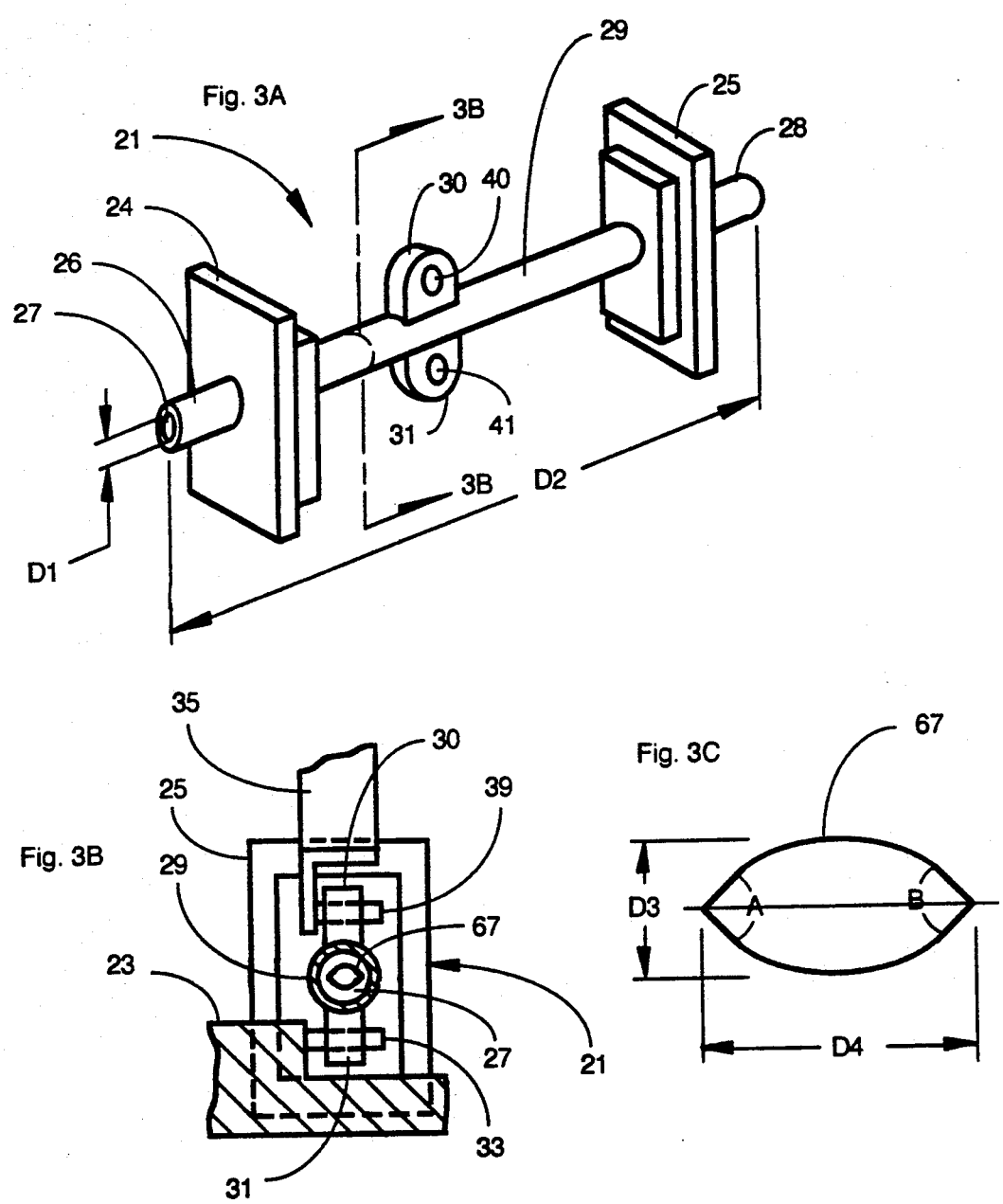

POSITIVE OPENING PINCH VALVE

FIELD OF THE INVENTION

The present invention is in the field of valves for the control of fluid flow, and more particularly in the area of such valves constructed in part of flexible material, where the material is deformed to limit or stop fluid flow. The present invention has particular application in handling and control of chemicals and reagents in chemistry and biochemistry applications.

BACKGROUND OF THE INVENTION

Fluid control valves, and valves formed of flexible materials where the material of a fluid conductor through the valve is deformed to limit or stop flow are numerous in the art. Such valves are often termed pinch valves.

FIG. 1A is a view of a round, flexible fluid conductor 11, end-on, with a frame member 13 outside the conductor and a movable pinch member 15 opposite frame member 13, in a typical arrangement for a pinch valve of the prior art. FIG. 1B shows the valve of FIG. 1A in a side view. FIGS. 1A and 1B show conductor 11 in the open position. FIG. 1C shows the pinch valve of FIG. 1A with pinch member 15 moved to pinch the valve closed, in end view as in FIG. 1A. FIG. 1D shows the valve in side view, as in FIG. 1B, but in the closed position. The view of FIG. 1C is along the section line 1C—1C of FIG. 1D. Flexible pinch valves have an advantage particularly in operations requiring feeding and flow control of chemicals and corrosive fluids, because only one material, i.e. the flexible material of the fluid conductor need be exposed to the fluid. This reduces the probability of contamination. Another advantage is that there are few moving parts, and the moving parts are outside the fluid path. Yet another advantage is that there are no seals inside the flow passage to wear and require replacement. There are some problems with pinch valves of the sort shown in FIGS. 1A, B, C, and D. One such problem is that the inside surfaces of the conductor that are pressed together to pinch off the fluid flow tend to stick together. The restoring force to open the valve after the movable pinch member is withdrawn is provided in part by the spring nature of the flexible material, and in part by any pressure applied through the fluid within the fluid conductor. In the absence of any pressure, or of quite low pressure, the restoring force is the spring nature of the material only.

Another problem often encountered is in the geometry of the passage through the flexible fluid conductor. To stop the flow entirely it is necessary that the passage be pinched closed entirely. Consider two points 17 and 19 of the normally round flow conductor 11 in the pinched condition as shown in FIG. 1C. The flexible material is severely folded at these points, and under considerable internal stress. As the valve is operated repeatedly, the material of conductor 11 at points 17 and 19 suffers fatigue and wear, and is subject to early failure, causing the valve to fail.

Yet another problem of pinch valves of the type shown by FIG. 1A through FIG. 1B is in the way that the flexible fluid conducting member is supported at points away from the pinch area. If for example, one end or the other of a flexible fluid conductor is not adequately supported, and is allowed to move under the influence of some other apparatus external to the valve, the effect may be much the same as if the pinch member moving by some amount, when in fact the pinch member has not moved at all. Flow through the valve might be slowed or stopped altogether at a time when the valve is meant to be open.

What is clearly needed is a pinch valve with a pinch member that may apply force to open the valve as well as to pinch the valve closed. More advantage will be gained if such a pinch valve has a fluid conductor passage shaped to alleviate or eliminate severe pinch points that would otherwise present regions of high stress and fatigue. Even more advantage will be gained if the valve has adequate restraints for the fluid conductor so tension or torsion in the conductor away from the pinch area will not be transferred to the pinch area.

SUMMARY OF THE INVENTION

A pinch valve for controlling fluid flow is provided with a passage for fluid through a flexible fluid conductor. The flexible fluid conductor has a projection on one side engaging the frame to hold one side of the passage stationary and a projection on the other side of the passage engaging an actuator for opening and closing the passage. In a preferred embodiment the projections have holes for engaging pins in the frame and the actuator respectively. In the preferred mode the actuator is a solenoid assembly with a spring-loaded core, and the core is attached to the flexible fluid conductor, so the passage through the flexible conductor is pinched closed by the force provided by the spring while the solenoid of the assembly is deenergized, and opened by positive force of the solenoid applied to the core while the solenoid is energized. The positive opening force applied to the passage through the conductor overcomes any tendency of surfaces in the fluid passage to stick together.

In other embodiments the valve is normally open and actuated closed, or actuated open and actuated closed by a dual solenoid arrangement. In the preferred mode the passage has a cat's eye shaped portion between the projections for attachment to the actuator and the frame, to lessen the force required to operate the valve. Also in the preferred mode the fluid conductor has ends configured to engage the frame, so forces applied to the fluid passage from connectors or tubings are not transferred to the pinch area of the valve.

BRIEF DESCRIPTION OF THE DRAWINGS

FIG. 3A is an enlarged view of a flexible fluid conductor from FIG. 2A.

FIG. 3B is a section view through the fluid conductor of FIG. 3A with elements from FIG. 2A added to show the operation of the valve.

FIG. 3C is an enlargement of a portion of the fluid passage through the flexible fluid conductor of FIG. 3A.

DESCRIPTION OF THE PREFERRED EMBODIMENTS

Figure 1A:
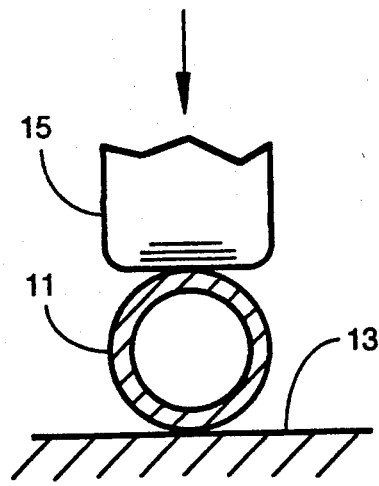
FIG. 1A is an end view of elements of a conventional pinch valve in an open state.
Figure 1B:
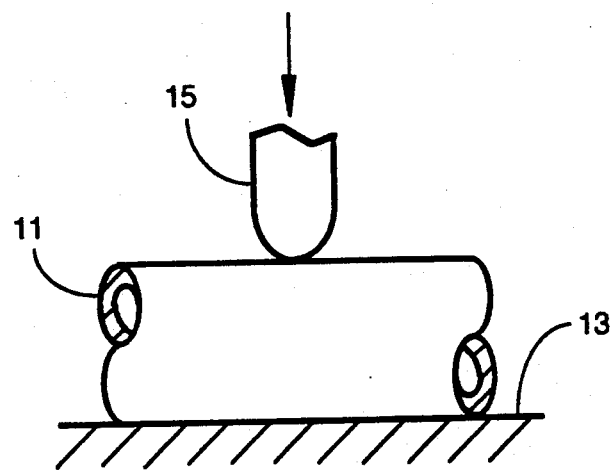
FIG. 1B is a side elevation view of the valve of FIG. 1A in the open state.
Figure 1C:
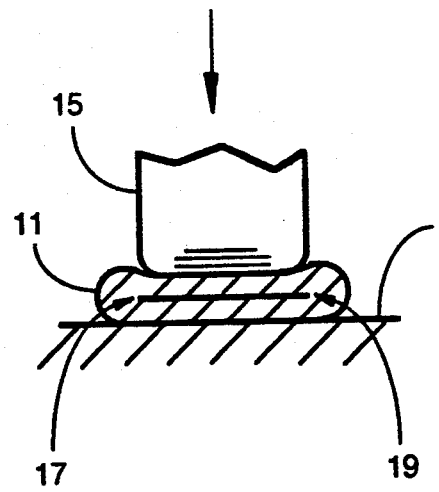
FIG. 1C is an end view of the valve of FIG. 1A in a closed state taken along section line 1C—1C of FIG. 1D.
Figure 1D:
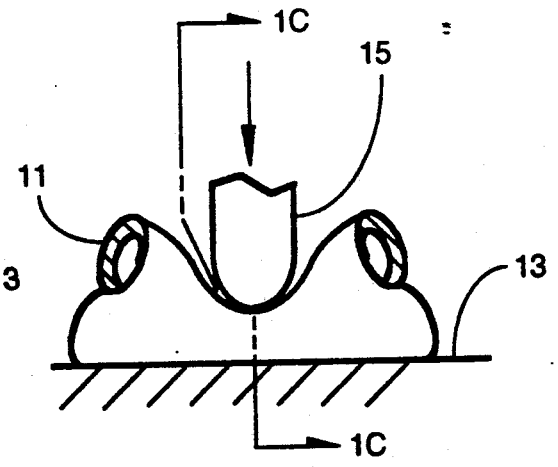
FIG. 1D is a side elevation view of the valve of FIG. 1A in the closed state.
Figure 2A:
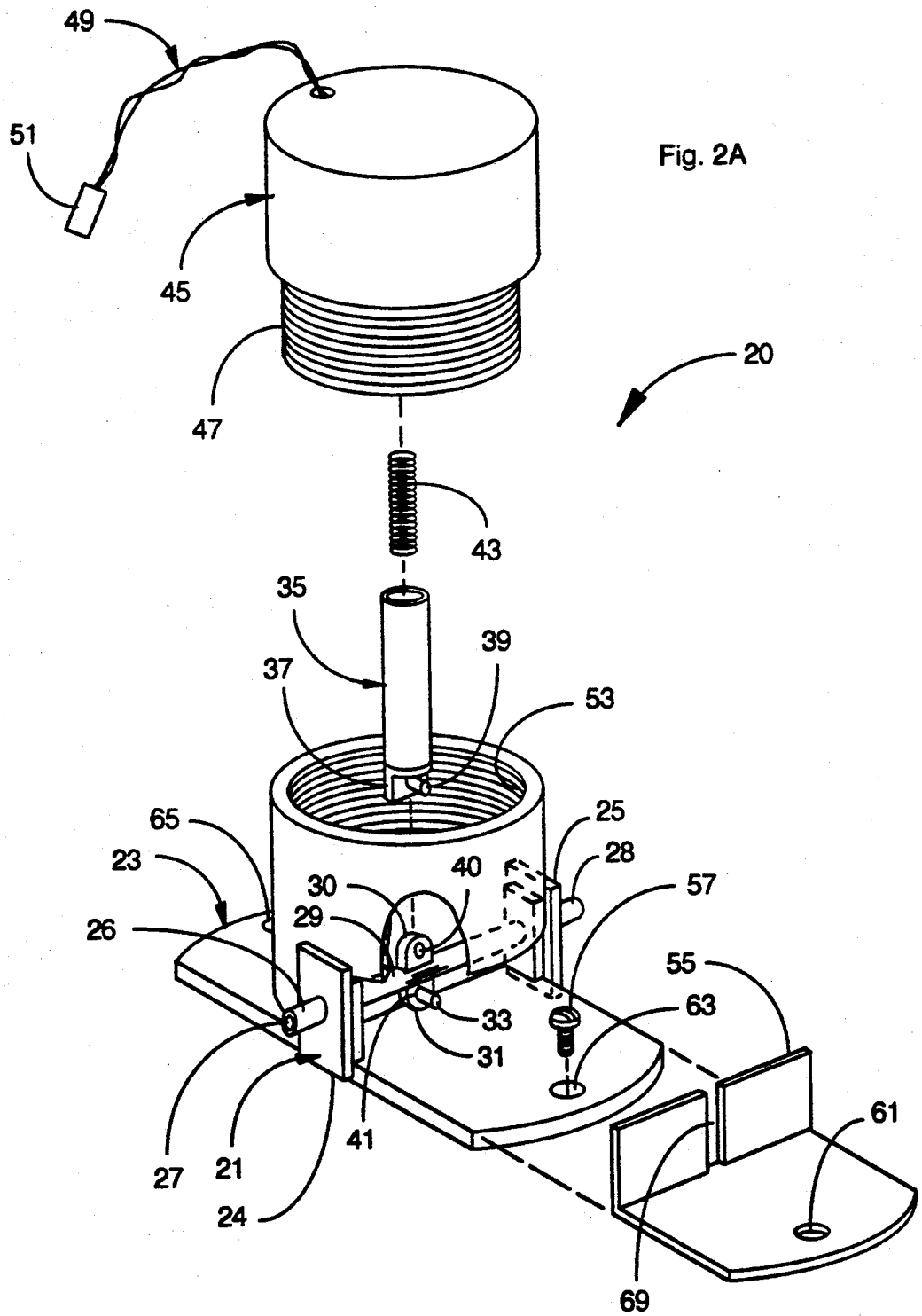
FIG. 2A is a partially exploded perspective view of a valve according to a preferred embodiment of the invention.

FIG. 2A is a perspective view, partly exploded, showing a pinch valve 20 according to a preferred embodiment of the invention. A flexible fluid conductor 21 is supported partly by ends 24 and 25 in a support frame 23. In the preferred embodiment support frame 23 is machined from a metal such as aluminum or stainless steel, and the flexible fluid conductor is molded from a flexible polymeric material, such as synthetic rubber. The flexible material needs to be compatible with the fluid to be conducted and controlled by the pinch valve.

A central portion 29 of conductor 21 joins ends 24 and 25. A passage 27 through about the center of the fluid conductor in the preferred embodiment is the path taken by fluid controlled by the pinch valve. Extended ends 26 and 28 are for convenience in attaching conduits to the pinch valve for fluid flow. No attached conduits are shown in FIG. 2A.

There are two extensions 30 and 31 on opposite sides of central portion 29. Extension 31 has a hole 41 through which a pin 33 passes, and pin 33 fits into a hole (not shown) in an inner surface of frame 23. Extension 31 of the fluid conductor is anchored by pin 33 to the support frame. A solenoid assembly 45 with a threaded portion 47 screws into threads 53 in frame 23, and the solenoid assembly has a core 35 urged in assembly, toward fluid conductor 21 by a spring 43. The solenoid is energized as required to operate the pinch valve by electrical signals applied via electrical attachment 49, which terminates at a connector 51 for convenient connection to control wiring. The solenoid, spring, and core are shown in exploded view to better illustrate the arrangement of elements in the preferred embodiment.

Core 35 has an end element 37 with a pin 39, which, when assembled, engages hole 40 in extension 30 of the fluid conductor. FIG. 3A is an enlarged view of flexible fluid conductor 21 to more clearly show the elements described with reference to FIG. 2A. FIG. 3B is a section through portion 29 of conductor 21 as indicated by section line 3B—3B of FIG. 3A in the direction of the arrows. A portion of frame 23, pin 33, pin 39, and a part of core 35 have been added to FIG. 3B to more clearly indicate how the elements are arranged in the preferred embodiment.

FIG. 3B shows middle portion 29 of conductor 21 in section, passage 27 through the conductor, and a portion 67 of passage 27 with a cat's eye shape. Passage portion 67 is a short section of passage 27 in the region between extensions 30 and 31, and is the region that is deformed in the preferred embodiment to pinch the passage closed. FIG. 3C is an enlargement of portion 67 of passage 27 to better illustrate the shape in the preferred embodiment.

In a fully assembled valve, with the solenoid deenergized, spring 43 (FIG. 2A) urges core 35, hence pin 39 toward pin 33, applying pressure to passage 67 between the pins. The passage closes, folding at the junction lines at the apex of each of angles A and B (FIG. 3C), pinching off passage 27 through the valve and occluding any flow of fluid through the valve. The valve is opened by energizing the solenoid, which draws pin 39 away from pin 33, opening passage 27 through the valve, and allowing fluid to flow. The action of the solenoid which tends to open the valve when energized, pulling the pins that are inserted into the extensions, which pulls the pinch region apart, is not available in a conventional pinch valve. This positive opening action of the valve in the preferred embodiment overcomes any tendency of the valve to stick closed. Further, the cat's eye shape requires a smaller sealing force than a round passage so a smaller solenoid developing less thrust may be used than would otherwise be needed. The cat's eye shape also allows the valve pinch passage to close with much less stress on the material in the pinch region than is common with valves without this feature. Also, integral end pieces 24 and 25, each having a rectangular shape, fit into rectangular slots in the support frame, providing support on both sides of the pinch region such that tension or torsion is not transmitted from outside to the pinch region to possibly interfere with the operation of the valve. In the preferred embodiment, designed for use with apparatus in biochemical applications, passage 27 has a diameter D1 of about 1.3 mm. and the length of the flexible conductor, D2, (FIG. 3A) is about 25 mm. Angles A and B of the shape of passage portion 67 (FIG. 3C) are preferably less than 120 degrees. The angles would be 120 degrees if the shape were the shape of a hexagon with equal angles. Angles A and B are most preferably each 90 degrees or less. Dimension D3 in the preferred embodiment is about 0.75 mm. and dimension D4 is about 1.25 mm.

Assembly of the elements of the pinch valve in the preferred embodiment is accomplished internally through a cut away side of the cylinder of support frame 23 (FIG. 2A). After flexible conductor 21 is placed in the frame and engaged with pin 33, and pin 39 of core 35 is engaged in hole 41 of the flexible conductor, a closure plate 55 is aligned to close the opening in the frame. The closure plate bears against ends 24 and 25 of the flexible conductor, forming a closed side to each of the rectangular openings in the frame, and helping to support the ends of the flexible conductor. Holes 61 and 63 align, and the closure plate is secured by a fastener 57 through the aligned holes. This fastener, along with a second fastener (not shown) through a second hole 65 in the frame, serve to mount the assembled valve to other apparatus for use. A slot 69 in the closure plate aligns movable pin 39 with fixed pin 33 so that the solenoid plunger and pin 39 may not rotate after assembly or in operation.

Figure 2B:
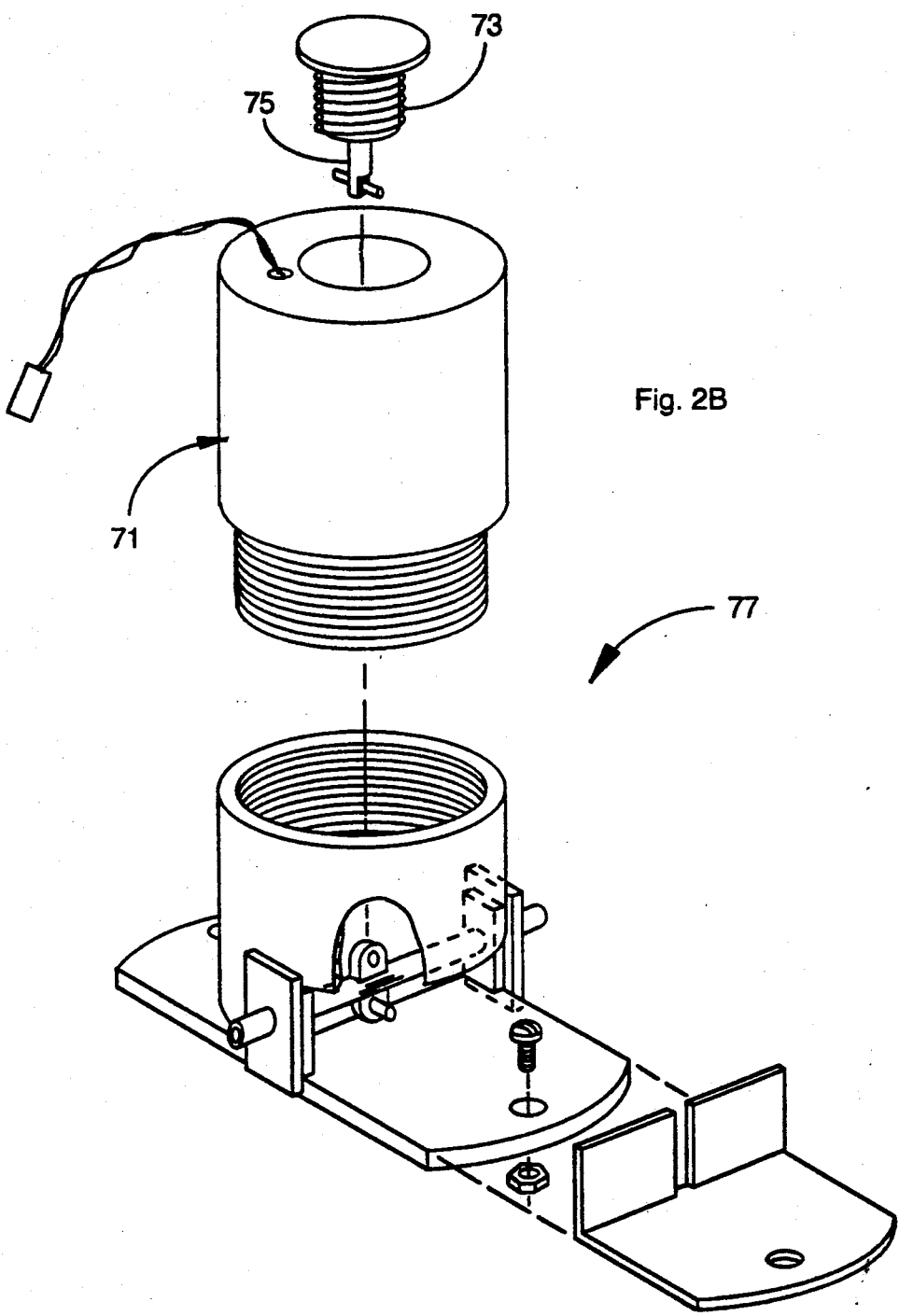
FIG. 2B is partially exploded perspective view of a valve according to an alternative preferred embodiment.

Although the use of a solenoid to open the pinch valve with a spring to close is the preferred mode, there are other modes in alternative embodiments that are also useful. FIG. 2B, for example shows a valve 77 similar to the valve of FIG. 2A, except that core 75 has an attachment to contain an external compression spring 73, and the valve becomes a normally open valve. Energizing solenoid 71 for valve 77 causes the valve to close. In this embodiment spring 73 provides a restoring force which opposes any "sticking" of the closed passage.

Figure 2C:
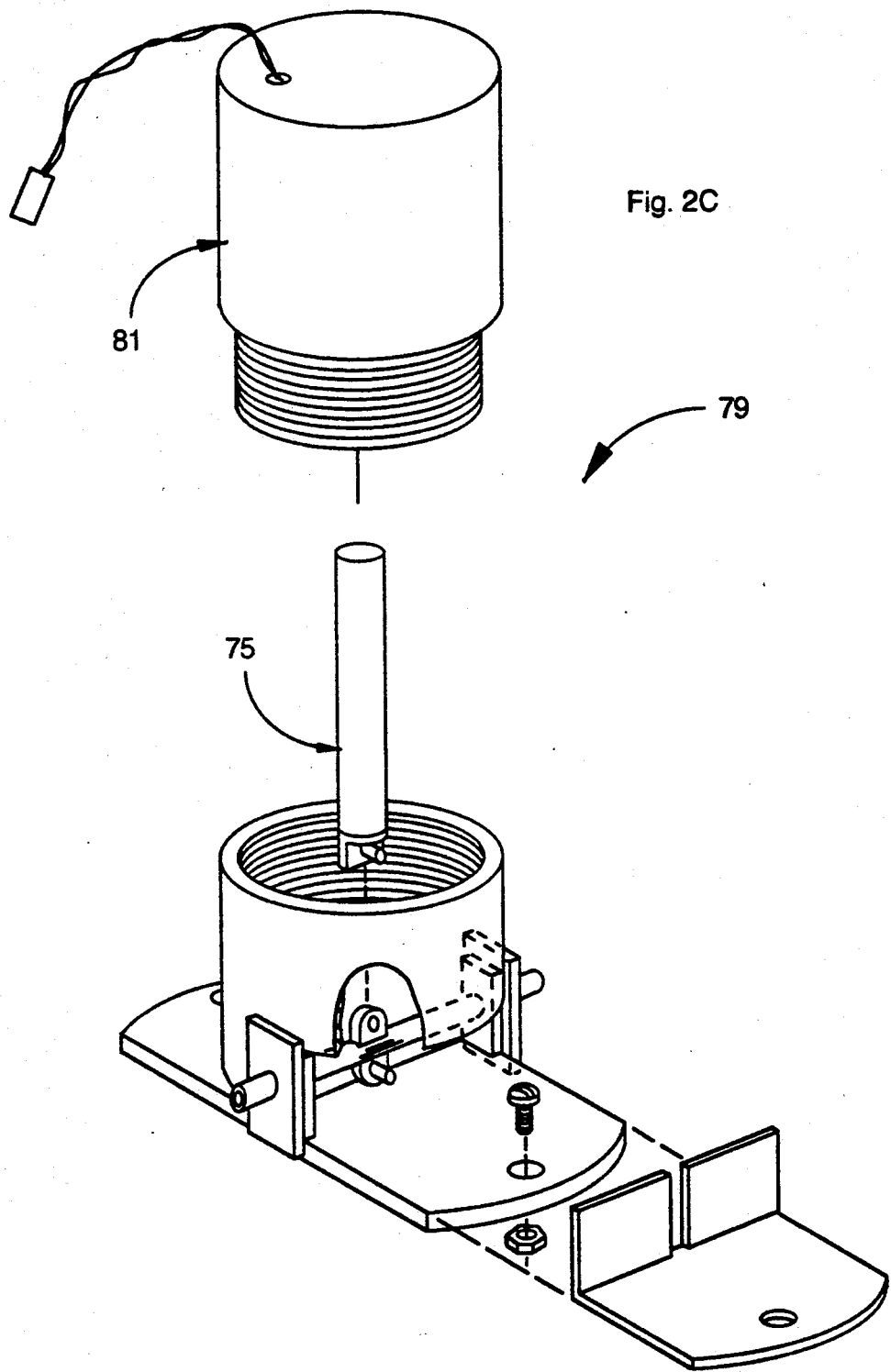
FIG. 2C is a partially exploded perspective view of a valve according to yet another alternative preferred embodiment.

FIG. 2C shows a valve in an alternative preferred embodiment without a spring. There are two solenoid coils in solenoid assembly 81, so core 75 may be urged in one direction by activating one solenoid and in the other direction by activating the other solenoid. No spring is necessary, and operation is positive in both directions.

It will be apparent to a person skilled in the art that there are many alterations that may be made without departing from the spirit and scope of the invention. For example, the dimensions described in the preferred embodiment are for a valve intended for use with apparatus used in biochemical processes. In valves for other purposes, the dimensions could be greater or smaller than those described. As another example, there are many shapes that might be used for the pinch passage that do not conform exactly to the cat eye shape shown in the drawings, without departing from the spirit and scope of the invention. There are also a number of different ways that the ends of the flexible passage might be supported to a frame member.

The actuation of the valve does not require an electrical solenoid. There are many other ways that the valve could be activated, such as with a lever, a hydraulic device, or a pneumatic cylinder. An electrical solenoid is the preferred method of actuation. There are many other alterations that could be made within the spirit and scope of the invention.

What is claimed is:

1. A pinch valve for controlling fluid flow comprising:
   a flexible fluid conductor having a passage therethrough for conducting a fluid;
   actuator means for deforming said flexible fluid conductor to control said fluid flow, said actuator means comprising a first electrically operated solenoid means for opening said passage and
   a second electrically operated solenoid means for closing said passage;
   frame means for supporting said flexible fluid conductor and said actuator means;
   said flexible fluid conductor including:
      first engagement means on one side of said passage engaging said frame, for holding one side of said passage substantially stationary relative to said frame; and
      second engagement means on the opposite side of said passage from said first engagement means such that said actuator means, moving, opens and closes said passage.

2. A pinch valve for controlling fluid flow comprising:
   a flexible fluid conductor having a passage therethrough for conducting a fluid, said fluid conductor having a first end portion at one end of said passage, said first end portion shaped to engage a first opening in said frame means, and a second end portion at the opposite end of said passage, said second end portion shaped to engage a second opening in said frame means, such that said end portions are each held substantially stationary relative to said frame means, and stress induced by deforming said passage to open and close said pinch valve between said end portions is not transferred beyond said end portions;
   actuator means for deforming said flexible fluid conductor to control said fluid flow, said actuator means comprising a first electrically operated solenoid means for opening said passage and a second electrically operated solenoid means for closing said passage;
   frame means for supporting said flexible fluid conductor and said actuator means;
   said flexible fluid conductor including:
      first engagement means on one side of said passage engaging said frame, for holding one side of said passage substantially stationary relative to said frame; and
      second engagement means on the opposite side of said passage from said first engagement means such that said actuator means, moving, opens and closes said passage.

3. A flexible fluid conductor for a pinch valve, said conductor having a passage therethrough for conducting a fluid, comprising:
   first engagement means on one side of said passage for engaging a frame, said first engagement means including an extended portion of said flexible fluid conductor having a first hole therein for engaging a first pin; and
   second engagement means on the opposite side of said passage from said first engagement means, said second engagement means including a second extended portion of said flexible fluid conductor having a second hole therein for engaging a second pin, for engaging an actuator means to deform said passage.

4. A flexible fluid conductor for a pinch valve, said conductor having a passage therethrough for conducting a fluid, comprising:
   first engagement means on one side passage for engaging a frame; and
   second engagement means on the opposite side of said passage from said first engagement means, said second engagement means for engaging an actuator means to deform said passage;
   third engagement means at one end of said passage for engaging a frame to hold said one end of said fluid conductor substantially stationary relative to said frame; and
   fourth engagement means at the other end of said passage for engaging said frame for holding said other end of said passage substantially stationary relative to said frame.

5. A pinch valve for controlling fluid flow comprising:
   a flexible fluid conductor having a passage therethrough for conducting a fluid;
   actuator means for deforming said flexible fluid conductor to control said fluid flow; frame means for supporting said flexible fluid conductor and said actuator means; said flexible fluid conductor including:
      a first extended portion of said flexible fluid conductor on one side of said passage engaging said frame, and having a first hole therein for engaging a first pin to hold one side of said passage substantially stationary relative to said frame; and
      a second extended portion of said flexible fluid conductor on the opposite side of said passage from said first extended portion, said second portion having a second hole therein for engaging a second pin which is fixedly attached to said actuator means, such that said actuator means, moving, opens and closes said passage.

* * * * *